United States Patent Office 2,991,895
Patented July 11, 1961

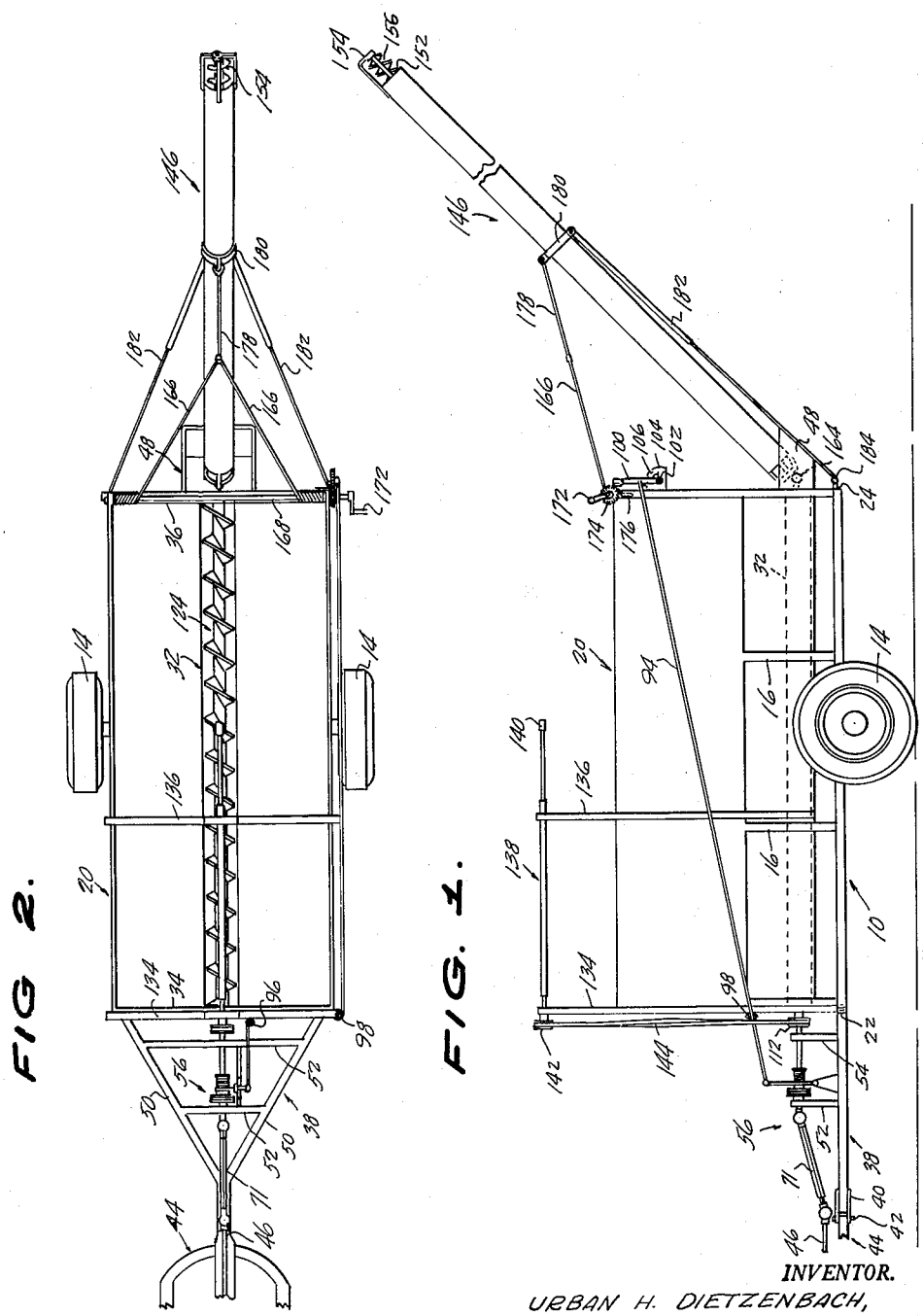

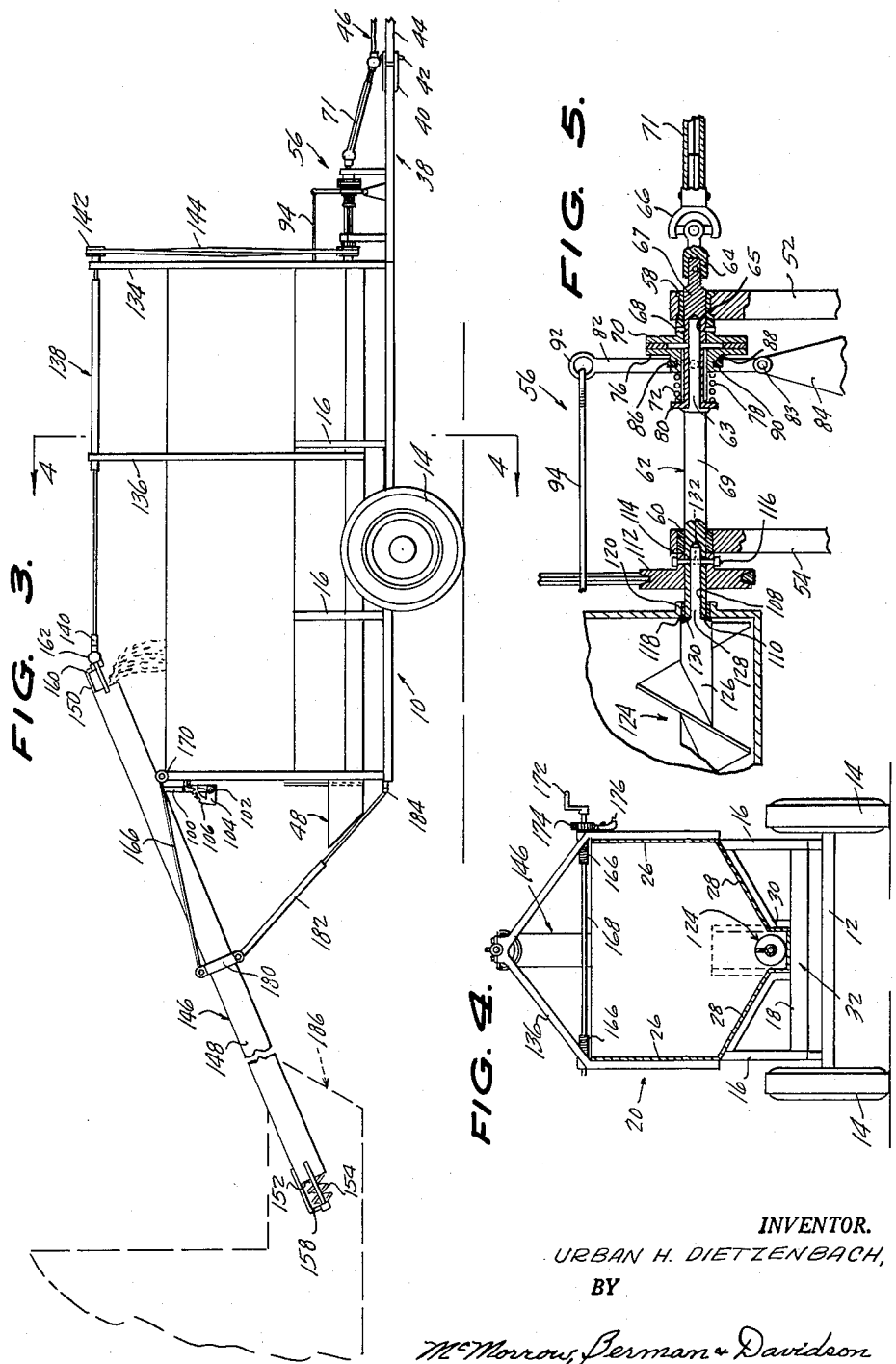

2,991,895
SELF-LOADING AND UNLOADING TRAILER
Urban H. Dietzenbach, Rte. 3, Cresco, Iowa
Filed July 24, 1959, Ser. No. 829,391
4 Claims. (Cl. 214—522)

This invention relates to a novel self-loading and unloading farm vehicle for handling grain and ground feed.

The primary object of the invention is to provide an efficient and versatile vehicle of this kind, preferably but not necessarily, in the form of a trailer, whose operating components obtain their drive from a power take-off of an associated farm tractor, the said vehicle being readily and quickly adjustable to load itself with such as grain and ground feed, and then to discharge the grain or feed to different desired locations from a station, such as outside of the fence of a feed lot, thereby eliminating the work and time losses involved in opening difficult or stuck fence gates and driving livestock out of the way and carrying and shoveling feed to different locations in a feed lot.

Another object of the invention is to provide a tractor of the character indicated above, wherein a single, dual purpose auger conveyor is employed for both loading and unloading of feed, the single conveyor being adjustable in position on the trailer and selectively connectable to drive means for performing its separate loading and unloading functions, and being angularly adjustable, in its unloading arrangement, to unload feed to different desired locations, as in a feed lot.

A further object of the invention is to provide a trailer of the character indicated above which is of uncomplex construction, is composed of a small number of simple and easily assembled parts, and which can be made in rugged and serviceable forms, from readily available materials and parts, at relatively low cost.

Other important objects and advantageous features of the invention will be apparent from the following description and the accompanying drawings, wherein, for purposes of illustration only, a specific form of the invention is set forth in detail.

In the drawings:
FIGURE 1 is a side elevation of a trailer of the present invention, its dual purpose conveyor is in an unloading position;
FIGURE 2 is a top plan view of FIGURE 1;
FIGURE 3 is an elevation of the other side of the trailer, showing its dual purpose conveyor in a loading position;
FIGURE 4 is a vertical transverse section taken on the line 4—4 of FIGURE 3; and
FIGURE 5 is an enlarged fragmentary vertical longitudinal section taken through the drive mechanism, showing the clutch thereof engaged.

Referring in detail to the drawings, wherein like numerals designate like parts throughout the several views, the illustrated trailer comprises a horizontal chassis frame 10 under which is suitably secured, at a midlength location, a transverse axle 12, carrying ground-engaging wheels 14 positioned laterally outwardly of the sides of the frame 10. Mounted upon the frame 10, as by means of longitudinally spaced uprights 16 between which are secured transverse bolsters 18, is a longitudinally elongated body 20. The forward end of the body 20 is preferably at the forward end 22 of frame 10 and the rear end of the body at the forward end 24 of the frame 10. The body 20, as seen in FIGURE 4, has parallel upper side walls 26 and downwardly converging lower side walls 28, the latter meeting, at their lower ends, the walls 30 of a central longitudinally elongated horizontal auger trough 32, which rests upon the bolsters 18, with the converging side walls 28 resting upon and secured to the uprights 16. The body 20 has closed, preferably perpendicular forward and rear end walls 34 and 36, respectively.

Fixed to and extending forwardly from the forward end of the chassis frame 10, in the horizontal plane thereof, is a triangular combined draw-bar and drive mechanism sub-frame 38, which has a clevis 40 on its forward apex end, to which is securable, as indicated at 42, the drawbar 44 of a farm tractor (not shown), having a rearwardly extending power take-off shaft 46. There is fixed on the rear end wall 36 of the body 20, in combination of, and in communication with the auger trough 32, a hopper 48, which is wider than and on the same level as the trough 32, and is spaced from the sides of the body 20.

The sub-frame 38 comprises forwardly converging side members 50, which are joined at their forward ends, and longitudinally spaced forward and rear cross members 52 and 54, respectively, secured to the side members and rising thereabove, and serving as bearing brackets, for components of a drive assembly 56.

As shown in FIGURE 5, the drive assembly 56 comprises a sectional shaft 62 having a forward section 67 journaled through the forward bearing 58 on the forward bracket 52, and a rear section 69 journaled through the rear bearing 60 on the rear bracket 54. Secured, as indicated at 64, on the forward end of the forward shaft section 67, is an extension drive shaft 71, incorporating a universal joint 66, to be connected to a tractor power take-off shaft 46.

The rear shaft section 69 has a reduced spindle 63 on its forward end which is engaged in a blind bore 65 in the rear end of the forward shaft section 67. A fixed clutch plate 70 is secured on the forward section 67, to be engaged by a movable clutch plate 76 having a hub 90 which is splined, as indicated at 72, on the forward shaft section 67. The movable clutch plate 76 is forced toward normal engagement with the fixed clutch plate 70 by a helical spring 78, which is circumposed on the forward section, behind the movable clutch plate 76, and is compressed between the clutch plate 76 and a flange 80 in the rear end of the forward shaft section 67.

The hub 90 of the movable clutch plate has a groove 88 in which is engaged a fork 86 on a vertical clutch releasing lever 82 which is pivoted at its lower end, as indicated at 83, on a bracket 84 upstanding on the sub-frame 38. At its upper end the lever 82 is connected, as at 92, to the forward end of a cable 94, which runs through pulleys 96 and 98 on the forward end wall 34 of the body 20 rearwardly along the left-hand side of the body, and is connected to a clutch releasing lever 100 which is pivotally mounted at 102, on a bracket 104, fixed on the upper part of the rear end wall 36 of the body 20 and having a detent section 106 engageable by a suitable dog (not shown) on the lever 100, whereby manual operation of the lever 100 serves to gradually disengage the movable clutch plate 76 from the fixed clutch plate 70, against the resistance of the spring 78.

The shaft 62 extends, at its rear end, through the rear bearing 60 and has an axial socket or blind bore 108 opening to its rear end 110. Fixedly circumposed on the shaft 62, immediately behind the rear bearing 60, is a drive pulley 112, which has a hub 114, through which extends a removable pin 116 which, when in place, extends across the socket 108. The rear end of the shaft 62 is journaled in a bearing 118 which is fixed, as indicated at 120, in an opening 122 provided in the body forward end wall 34, and centered with respect to the auger trough 32.

A stationary unloading auger 124 is disposed in the trough 32 and has a shaft 126 which is suitably journaled, at its rear end, through the rear end wall of the body 20, and which has on its forward end a reduced axial spindle 128 which defines a thrust shoulder 130 which bears against the rear side of the bearing 118, with the spindle 128 extending into the drive shaft socket 108. The spindle 128 has a transverse bore 132 through which the pin 116 is adapted to be passed and secured, so as to operatively connect the stationary auger 124 to the drive only in an unloading operation. For a loading operation, in which the stationary auger 124 is intentionally out of operation, the pin 116 is withdrawn, so that the drive shaft 62 turns freely relative to the spindle 128 and does not rotate the auger 124.

Forward and rear inverted V-shaped standards 134 and 136 are fixed to and rise above the body 20, in the regions of the forward end wall 34 and a midlength point of the body respectively, and have rotatably and supportedly engaged through their apices a horizontal, rearwardly extending overhead jack shaft 138 which is extensible in length and has on its rear end a connector 140. Fixed on the forward end of the jack shaft 138 is a pulley 142, over which is trained a twisted endless belt 144 which is trained over and driven by the drive assembly pulley 112.

A dual purpose auger conveyor 146 comprises an open ended tube 148 having a discharge end 150 and an intake end 152. An auger 154, exposed only at the intake end 152, extends in the tube 148 and has a shaft 156 which, at the intake end of the tube 148, is journaled in a bracket 158 on the end 152, and at the discharge end of the tube, is journaled through a bracket 160, and has thereon a universal joint connector 162, for connection, at different times, to the stationary auger shaft spindle 128 and the overhead jack shaft 138.

For an unloading operation, the dual purpose conveyor 146 is mounted at the rear of the body 20, in a rearwardly inclined position, as shown in FIGURE 1, with the intake end 152 of its tube 148 disposed in the hopper 48 and with its universal connector 162 connected to the spindle 128 of the stationary auger shaft 126, as indicated at 164, with the pin 116 in place in the bore 132 of the spindle 118, so that both the stationary auger 124 and the auger 154 of the dual purpose conveyor 146 are driven at the same time, for moving material out of the body 20, through the trough 32 to the hopper 48, and up through the conveyor 146, to be discharged from its elevated discharge end 150.

The dual purpose conveyor 146 is held up in its inclined unloading position by means of dual cables 166 which are wound around a drum shaft 168 which extends across and immediately above the rear end wall 36 of the body 20 and is journaled thereon at its ends, as indicated at 170, the drum shaft 168 having a hand crank 172 on one end thereof, and a ratchet wheel 174, with which a releasable pawl 176 is engaged. The dual cables 166 are brought together and connected, as indicated at 178, to a collar 180 which is circumposed on an intermediate part of the conveyor tube 148. Turning the hand crank 172, with the ratchet pawl 176 released, enables changing the vertical angle of the conveyor 146 at will, to reach desired discharge locations. Extendable struts or guys 182, secured to and extending between the tube collar 180 and opposite sides of the rear end 34 of the chassis frame 10, as indicated at 184, are desirably provided to brace and steady the conveyor 146.

For a loading operation, the dual purpose conveyor 146, as shown in FIGURE 3, is disconnected from the spindle 128 of the stationary auger 124, removed from the hopper 48, and placed over and upon the upper edge of the rear end wall 36 of the body 20 in a rearwardly declining position, and its universal connector 162 is connected to the connector 140 on the rear end of the overhead jack shaft 138. In this instance, the pin 116 is removed from the stationary auger spindle 128 so as to render the stationary auger 124 inoperative, and leave the jack shaft 138 operatively connected to the drive assembly 56, so that, with the depressed intake end 152 of the conveyor tube 148 positioned in such as a storage bin 186 and the discharge end 150 positioned over the body 20, feed or grain from the bin 186 will be loaded into the body 20, as the clutch releasing lever 100 is operated to produce engagement of the clutch of the drive assembly 56. Loading and unloading operation can be stopped and started, whenever desired, by appropriate operation of the lever 100.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A self-loading and unloading vehicle comprising a horizontal chassis frame having forward and rear ends, a body mounted upon said frame and having front and rear end walls, a sub-frame fixed on and extending forwardly from the forward end of said chassis frame, draft means on said sub-frame for connection to the drawbar of a tractor, said body having a bottom wall, a horizontal longitudinal trough on said bottom wall, said trough having a forward end opening through the front end wall of the body, a hopper fixed on the front end wall in material receiving relation to the forward end of the trough, a stationary auger disposed lengthwise in said trough and journaled at related ends in the body end walls, said stationary auger having a spindle on its rear end projecting into said hopper, a drive assembly mounted upon said sub-frame having means for drive connection thereof to the power take-off of a tractor, and means for releasably connecting said drive assembly to the stationary auger spindle, and a dual purpose conveyor comprising a conveyor tube having a discharge end and an intake end, an auger mounted within said tube, said conveyor auger having a universal connector on the end thereof adjacent to the intake end of the tube, means supporting the dual-purpose conveyor with its intake end in said hopper and with its universal connector connected to the stationary auger spindle, a longitudinal horizontal jackshaft mounted on and extending above the body, said jack-shaft having a rear end having a connector thereon and having a forward end, means operatively connecting the forward end of the jack-shaft to said drive assembly, said dual purpose conveyor being removable from the hopper, with its universal connector disconnected from the stationary auger spindle, and with said releasable connecting means released, said dual purpose conveyor then being supportable on the body rear wall in a rearwardly declining position with the intake end of the tube depressed to engage in a supply bin and its discharge end elevated and positioned over the body, with the universal connector of the auger of the dual purpose conveyor connected to the connector of the jack-shaft.

2. A self-loading and unloading vehicle comprising a horizontal chassis frame having forward and rear ends, a body mounted upon said frame and having front and rear end walls, a sub-frame fixed on and extending forwardly from the forward end of said chassis frame, draft means on said sub-frame for connection to the drawbar of a tractor, said body having a bottom wall, a horizontal longitudinal trough on said bottom wall, said trough having a forward end opening through the front end wall of the body, a hopper fixed on the front end wall in material receiving relation to the forward end of the trough, a stationary auger disposed lengthwise in said trough and journaled at related ends in the body end walls, said stationary auger having a spindle on its rear end projecting into said hopper, a drive assembly mounted upon said sub-frame having means for drive connection thereof to the power take-off of a tractor, and means for releasably connecting said drive assembly to the stationary auger spindle, and a dual purpose conveyor comprising a conveyor tube having a discharge end and an intake end, an auger mounted within said tube, said conveyor auger having a universal connector on the end thereof adjacent to the intake end of the tube, means supporting the dual-purpose conveyor with its intake end in said hopper and with its universal connector connected to the stationary auger spindle, a longitudinal horizontal jack-shaft mounted on and extending above the body, said jack-shaft having a rear end having a connector thereon and having a forward end, means operatively connecting the forward end of the jack-shaft to said drive assembly, said dual purpose conveyor being removable from the hopper, with its universal connector disconnected from the stationary auger spindle, and with said releasable connecting means released, said dual purpose conveyor then being supportable on the body rear wall in a rearwardly declining position with the intake end of the tube depressed to engage in a supply bin and its discharge end elevated and positioned over the body, with the universal connector of the auger of the dual purpose conveyor connected to the connector of the jack-shaft, said drive assembly comprising a longitudinal drive shaft journaled on said sub-frame and having forward and rear ends, a pulley fixed on the rear end of the drive shaft, said operative connecting means being a pulley fixed on the jack-shaft and an endless belt trained around the two pulleys.

3. A self-loading and unloading vehicle comprising a horizontal chassis frame having forward and rear ends, a body mounted upon said frame and having front and rear end walls, a sub-frame fixed on and extending forwardly from the forward end of said chassis frame, draft means on said sub-frame for connection to the drawbar of a tractor, said body having a bottom wall, a horizontal longitudinal trough on said bottom wall, said trough having a forward end opening through the front end wall of the body, a hopper fixed on the front end wall in material receiving relation to the forward end of the trough, a stationary auger disposed lengthwise in said trough and journaled at related ends in the body end walls, said stationary auger having a spindle on its rear end projecting into said hopper, a drive assembly mounted upon said sub-frame having means for drive connection thereof to the power take-off of a tractor, and means for releasably connecting said drive assembly to the stationary auger spindle, and a dual purpose conveyor comprising a conveyor tube having a discharge end and an intake end, an auger mounted within said tube, said conveyor auger having a universal connector on the end thereof adjacent to the intake end of the tube, means supporting the dual-purpose conveyor with its intake end in said hopper and with its universal connector connected to the stationary auger spindle, a longitudinal horizontal jack-shaft mounted on and extending above the body, said jack-shaft having a rear end having a connector thereon and having a forward end, means operatively connecting the forward end of the jack-shaft to said drive assembly, said dual purpose conveyor being removable from the hopper, with its universal connector disconnected from the stationary auger spindle, and with said releasable connecting means released, said dual purpose conveyor then being supportable on the body rear wall in a rearwardly declining position with the intake end of the tube depressed to engage in a supply bin and its discharge end elevated and positioned over the body, with the universal connector of the auger of the dual purpose conveyor connected to the connector of the jack-shaft, said drive assembly comprising a longitudinal drive shaft journaled on said sub-frame and having forward and rear ends, a pulley fixed on the rear end of the drive shaft, said operative connecting means being a pulley fixed on the jack-shaft and an endless belt trained around the two pulleys, said drive connection means comprising a releasable normally engaged clutch incorporated in said drive shaft, and manual means for releasing the clutch.

4. A self-loading and unloading vehicle comprising a horizontal chassis frame having forward and rear ends, a body mounted upon said frame and having front and rear end walls, a sub-frame fixed on and extending forwardly from the forward end of said chassis frame, draft means on said sub-frame for connection to the drawbar of a tractor, said body having a bottom wall, a horizontal longitudinal trough on said bottom wall, said trough having a forward end opening through the front end wall of the body, a hopper fixed on the front end wall in material receiving relation to the forward end of the trough, a stationary auger disposed lengthwise in said trough and journaled at related ends in the body end walls, said stationary auger having a spindle on its rear end projecting into said hopper, a drive assembly mounted upon said sub-frame having means for drive connection thereof to the power take-off of a tractor, and means for releasably connecting said drive assembly to the stationary auger spindle, and a dual purpose conveyor comprising a conveyor tube having a discharge end and an intake end, an auger mounted within said tube, said conveyor auger having a universal connector on the end thereof adjacent to the intake end of the tube, means supporting the dual-purpose conveyor with its intake end in said hopper and with its universal connector connected to the stationary auger spindle, a longitudinal horizontal jack-shaft mounted on and extending above the body, said jack-shaft having a rear end having a connector thereon and having a forward end, means operatively connecting the forward end of the jack-shaft to said drive assembly, said dual purpose conveyor being removable from the hopper, with its universal connector disconnected from the stationary auger spindle, and with said releasable connecting means released, said dual-purpose conveyor then being supportable on the body rear wall in a rearwardly declining position with the intake end of the tube depressed to engage in a supply bin and its discharge end elevated and positioned over the body, with the universal connector of the auger of the dual-purpose conveyor connected to the connector of the jack-shaft, said drive assembly comprising a sectional drive shaft having a forward section to which said drive connection means is connected, and a rear section free to turn relative to the forward section, a fixed clutch plate on said forward section, a spline sleeve fixed on said rear section, a movable clutch plate splined on said sleeve, spring means acting between the sleeve and the movable plate and normally urging the movable plate into engagement with the fixed plate, a clutch releasing lever connected to said movable clutch plate.

References Cited in the file of this patent

UNITED STATES PATENTS

| | | |
|---|---|---|
| 1,702,000 | Gibson et al. | Feb. 12, 1929 |
| 2,296,007 | Weisenberger | Sept. 15, 1942 |
| 2,410,996 | Patterson | Nov. 12, 1946 |
| 2,425,681 | Lewis et al. | Aug. 12, 1947 |
| 2,431,000 | Step | Nov. 18, 1947 |
| 2,439,541 | Hall | Apr. 13, 1948 |
| 2,490,241 | Smith et al. | Dec. 6, 1949 |
| 2,566,690 | Wright | Sept. 4, 1951 |
| 2,849,137 | Hansen | Aug. 26, 1958 |